United States Patent [19]
Klein et al.

[11] Patent Number: 5,265,930
[45] Date of Patent: Nov. 30, 1993

[54] VEHICLE ROOF

[75] Inventors: Berthold Klein, Rutesheim; Anton Reichel, Ditzingen; Johann Tomforde; Bruno Sacco, both of Sindelfingen, all of Fed. Rep. of Germany

[73] Assignee: Mercedes-Benz AG, Fed. Rep. of Germany

[21] Appl. No.: 817,505

[22] Filed: Jan. 7, 1992

[30] Foreign Application Priority Data

Jan. 7, 1991 [DE] Fed. Rep. of Germany ....... 4100240

[51] Int. Cl.⁵ .............................................. B60J 7/16
[52] U.S. Cl. ................... 296/107; 296/116; 296/121; 280/756
[58] Field of Search ............... 296/107, 116, 108, 121, 296/122, 136; 280/756

[56] References Cited

U.S. PATENT DOCUMENTS

| | | | |
|---|---|---|---|
| 1,784,279 | 12/1930 | Ellerbeck | 296/107 |
| 1,988,346 | 1/1935 | Wagner | 296/107 |
| 3,154,341 | 10/1964 | Booth | 296/136 X |
| 3,357,738 | 12/1967 | Bourlier | 296/108 |
| 3,425,742 | 2/1969 | Rauber, Jr. | 296/121 |
| 4,729,592 | 8/1988 | Tuchiya et al. | 296/116 |

FOREIGN PATENT DOCUMENTS

| | | | |
|---|---|---|---|
| 0261379 | 8/1987 | European Pat. Off. | |
| 0430425 | 6/1991 | European Pat. Off. | 296/121 |
| 3616017 | 11/1987 | Fed. Rep. of Germany | |
| 3733892 | 4/1989 | Fed. Rep. of Germany | 296/108 |

Primary Examiner—Dennis H. Pedder
Attorney, Agent, or Firm—Evenson, McKeown, Edwards & Lenahan

[57] ABSTRACT

The invention relates to a lowerable vehicle roof having a dimensionally stable roof shell in a front end area of the roof, which shell extends over the entire width of the roof and, when the roof is closed, is detachably connected to a frame profile of a front windscreen frame, lying opposite its front end face. When the roof is open the roof shell is disposed in a substantially transverse plane of the vehicle located behind a seat area. The roof shell which is swivelled about a horizontal vehicle transverse axis protrudes upwards in relation to a center horizontal plane of the vehicle and has in the protruding longitudinal area a viewing opening located essentially in the center of the vehicle width when the roof is open. So that the front end area of the vehicle roof can be made non-transparent, the front end face of the roof shell delimits, in the central area of the roof, an indentation of the roof shell which extends in the longitudinal direction of the vehicle when the roof is closed, the frame profile of the front windscreen frame being widened in the central area in a fashion which is complementary to said roof shell, and the roof shell being completely upright when the roof is open, as a result of which the indentation at the front end of the roof shell can be utilized as a viewing opening.

9 Claims, 6 Drawing Sheets

Fig. 5
Fig. 6
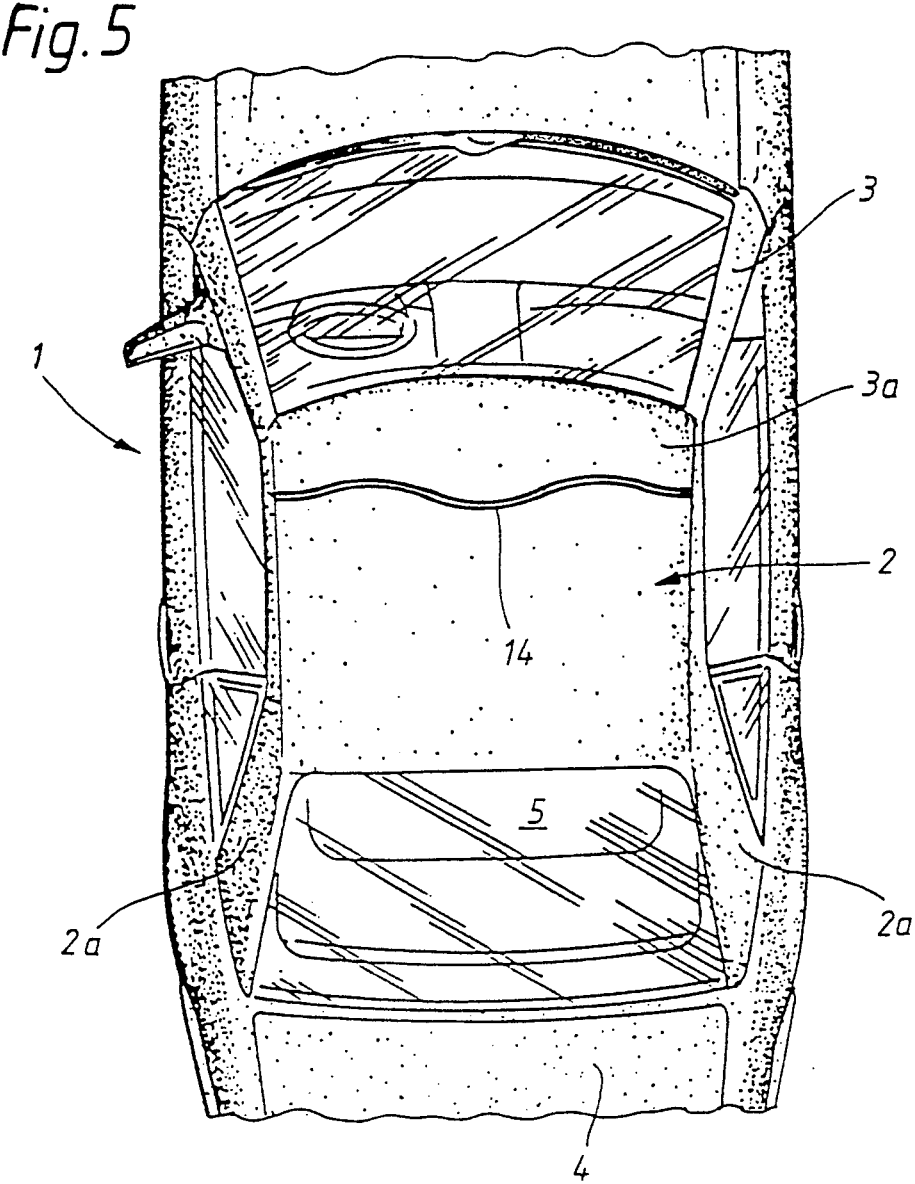
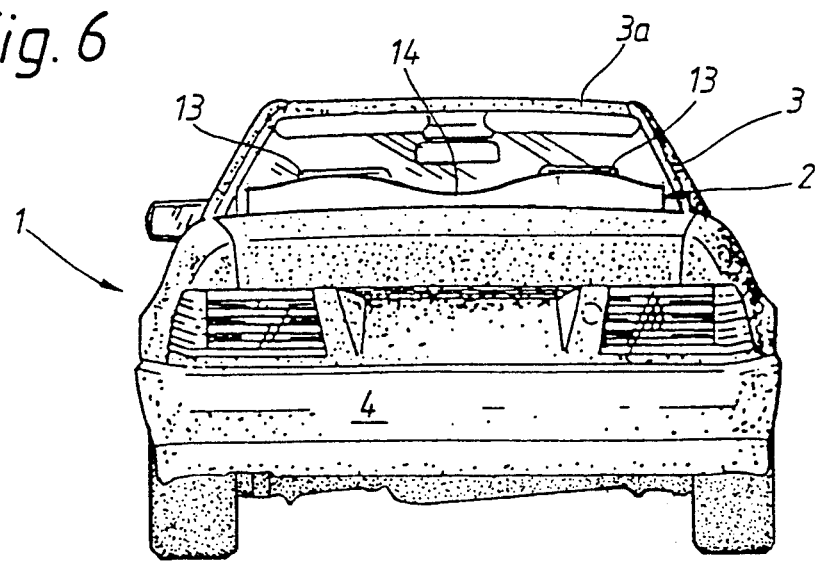

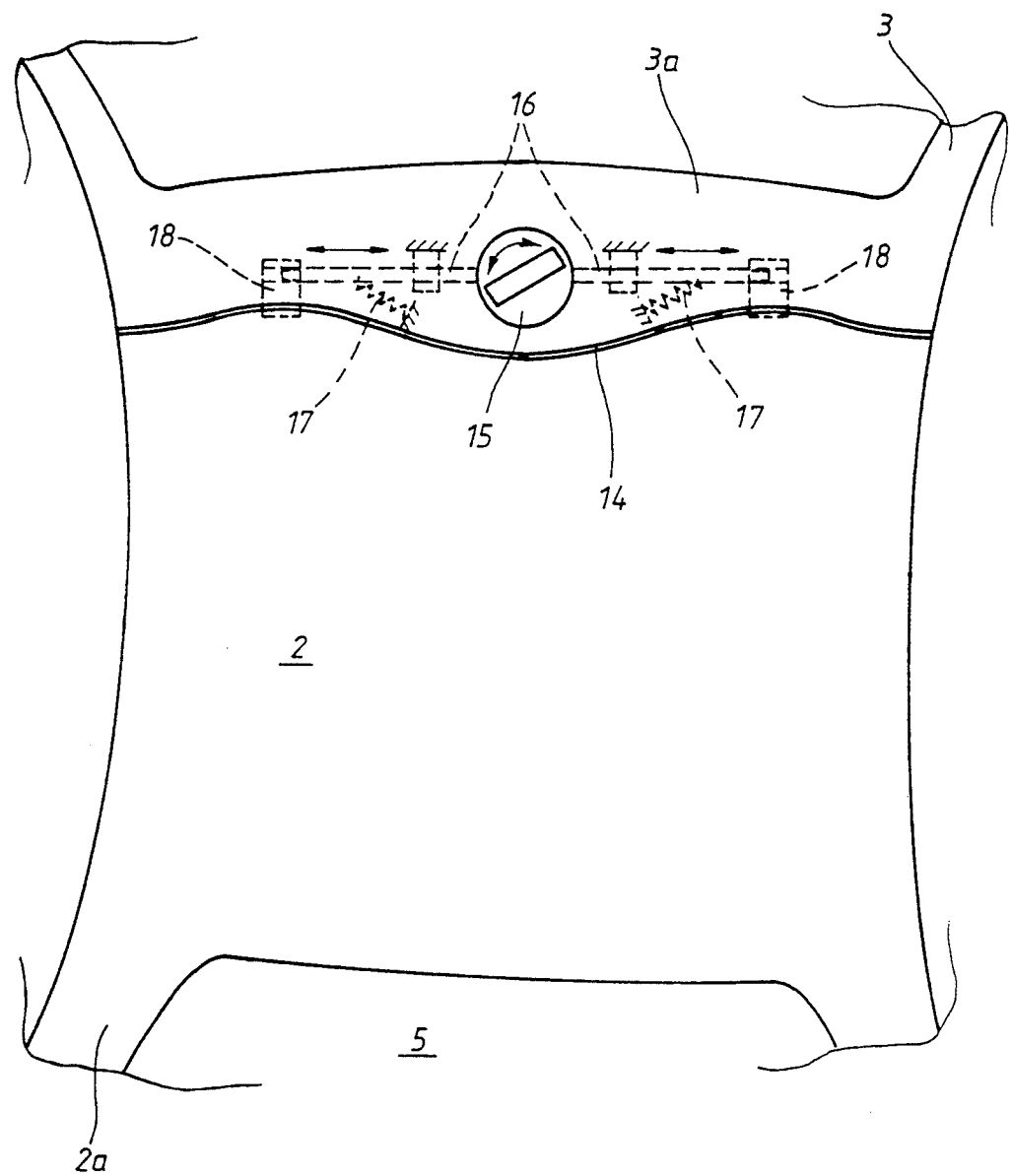

1

VEHICLE ROOF

BACKGROUND AND SUMMARY OF THE INVENTION

The invention relates to a selectively lowerable vehicle roof having a dimensionally stable roof shell which is movable between a closed position and an open stowed position.

A vehicle roof of this kind is already known from the German Patent Document DOS 36 16 017, a front part of the roof being constructed as a panel which can be displaced in the longitudinal direction of the vehicle. This roof part can be pushed onto the rear roof part in order to open the roof, after which the roof part covers an inclined rear plate of the roof part lying below it. So that, nevertheless, a largely unobstructed view to the rear is possible from the passenger compartment of the vehicle, the large sized glass roof is integrated into the front part of the roof. When driving with the vehicle in this open position, the passenger compartment of the vehicle is shielded by the roof parts against air flowing in from the rear. In addition, the rear roof part comprises a roll bar, by which means it is ensured that the vehicle is sufficiently resistant to rolling over. In the known vehicle roof it is to be considered as disadvantageous that its front roof part, which can already be displaced rearwards in its entirety in order to open the roof, additionally has to be provided with a glass roof or the like, which constitutes a considerable additional outlay. Also, when the vehicle is parked with the roof closed, the disadvantages known with glass roofs, such as for example a relatively high degree of heating of the vehicle passenger compartment as a result of direct exposure to the sun, have to be tolerated.

The invention is based on the object of further developing a vehicle roof of the generic type to the effect that, despite the fact that it has an overall nontransparent design, the front end area of the vehicle roof can have a viewing opening when the roof is open which improves the rear view.

This object is achieved according to the invention by providing an arrangement wherein the front end face of the roof shell delimits an indentation of the roof shell in the central area of the roof which extends in the longitudinal direction of the vehicle when the roof is closed, the frame profile of the front windscreen frame being widened in the central area in a fashion which is complementary to said roof shell, and wherein the roof shell is substantially completely upright when the roof is open, as a result of which the indentation at the front end of the roof shell can be utilized as a viewing opening.

Preferably, the indentation has the shape of a segment of a circle, as a result of which the complementary widening of the frame profile has no corners which, due to the arrangement of the widened portion above the front seats, would otherwise increase the risk of the vehicle occupants sustaining head injuries.

A further improvement of the view from the driver's seat to the rear is achieved in that the end face of the roof shell is curved in a wave shape viewed over its entire length, that is to say corresponding to the width of the roof. A wave shape is selected for the purpose of shielding against draughts in such a way that, when the roof is open, a crest of a wave of the wave shape is located behind each of the two seats arranged next to one another. This embodiment has the additional advantage that a continuous seal profile can be provided opposite the corresponding face on the frame profile in order to seal the end face of the roof shell. As a result, a seal arrangement can be ensured which is particularly economical and at the same time reliable over a long period of time.

When the vehicle roof is designed in one piece, together with a high buckling resistance of the same in the longitudinal direction of the roof shell, the longitudinal area of the vehicle roof protruding upwards out of the receiving space can at the same time fulfil the function of a roll bar.

Despite its single-piece construction, the vehicle roof remains easy to handle if the roof shell is attached to the body of the vehicle by means of a connecting rod arrangement. In addition the completely upright position of the vehicle roof can be reproduced particularly exactly by means of a mechanical positive movement.

For the detachable connection of the roof shell to the frame profile, two locks are provided, as is customary in hard tops, which are each arranged to the side of the central area. By utilizing the course of the connecting contour between the frame profile and the roof shell, a central actuation element can advantageously be arranged between the frame profile and roof shell on the underside of the widened central area, by means of which actuation element both locks can be synchronously locked or unlocked.

An arrangement for transmitting the movement between locking means and actuation element is possible by means of a driving rod drive which is particularly mechanically simple.

Preferably, the actuation element consists of a finger-grip knob with an axis of rotation running transversely to the roof plane since such a knob can be countersunk without difficulty in the frame profile.

Other objects, advantages and novel features of the present invention will become apparent from the following detailed description of the invention when considered in conjunction with the accompanying drawings.

BRIEF DESCRIPTION OF THE DRAWINGS

FIG. 5 shows a top view of the convertible of FIG. 1 with a completely closed roof;

FIG. 6 shows a rear view of the convertible of FIG. 1 with a completely opened roof; and FIG. 7 shows a view of the closed hard top of the convertible of FIG. 1 from below.

DETAILED DESCRIPTION OF THE DRAWINGS

Figure 1:
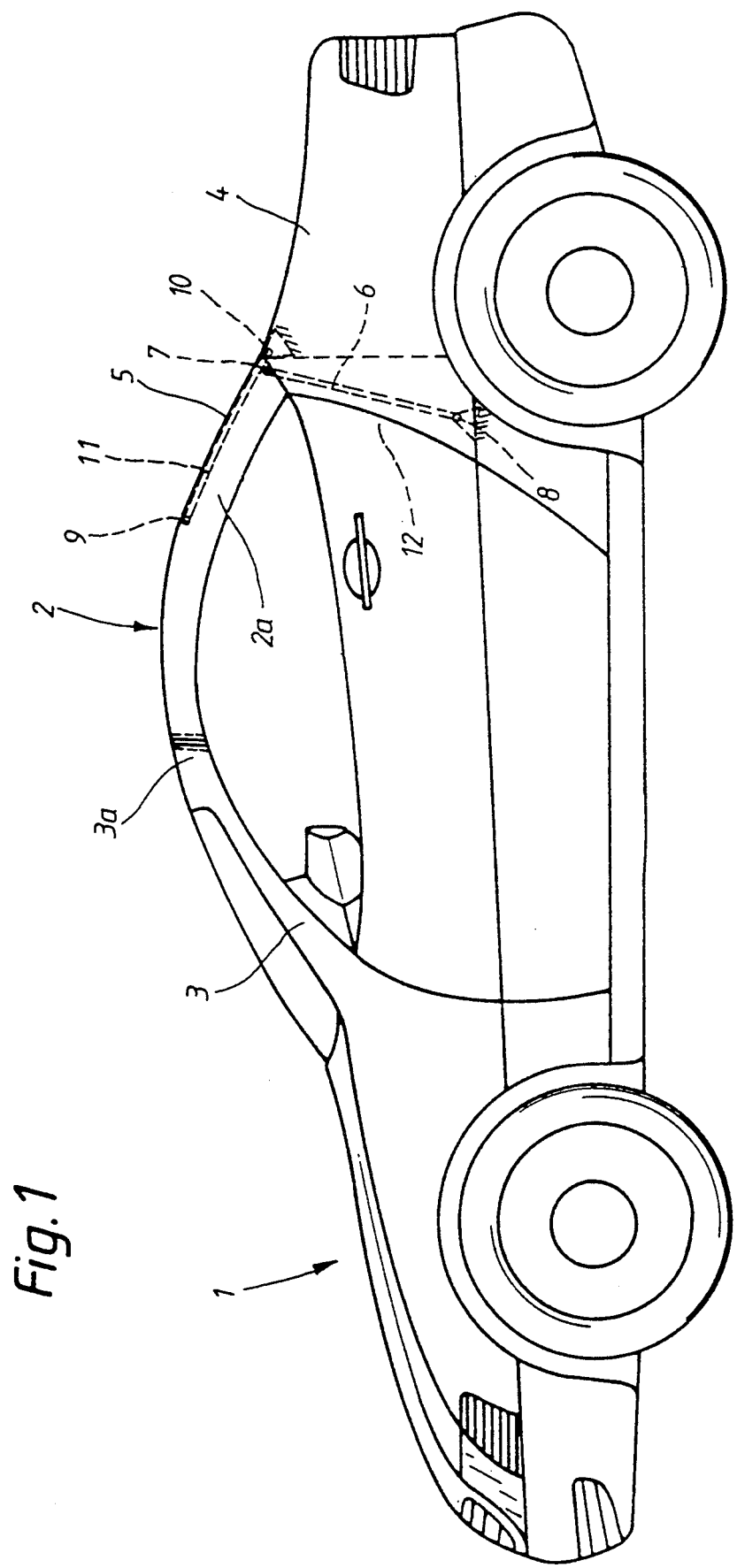
FIG. 1 shows a diagrammatic side view of a convertible with a lowerable hard top in the closed state, constructed according to a preferred embodiment of the invention.

A convertible 1, illustrated in FIG. 1, has a hard top which is rigid overall and is constructed in a manner known per se as a single-piece roof shell 2 and consists of high-strength aluminum.

The passenger compartment of the convertible 1 is covered at the top by the roof shell 2 connected to the front windshield frame 3, which holds the windshield, and to a rear luggage compartment part 4 of the vehicle body. In the longitudinal area of the roof shell 2, a rectangular rear window pane 5, which is bordered on both sides by a roof pillar 2a which is part of the roof shell 2, covers the vehicle interior space. Viewed from the side, the roof pillars 2a enclose an obtuse angle of approximately 160° with the longitudinal area of the roof shell 2 located in front of them. The roof pillars 2a merge, with an arcuate curvature, into the longitudinal area of the roof shell 2 lying in front of them. At the front, the roof shell 2 is detachably connected to an upper frame profile 3a of the front windshield frame 3, as will be explained in greater detail below. The joint between the end face of the roof shell 2 facing the front and the opposite corresponding face of the frame profile 3a extends virtually perpendicularly over the entire length of the joint.

The rear end of the roof shell 2 is connected via a connecting rod arrangement to the body of the convertible 1. This connecting rod arrangement comprises two support rods 6 which are arranged mirror-symmetrically with respect to the longitudinally central plane of the convertible 1 and are coupled by their respective upper ends to the respective lower ends of the associated roof pillar 2a and by their respective lower ends to the body of the convertible 1. In each case hinge joints 7 and B with a hinge axis running in each case at right angles to the longitudinal central plane serve for coupling, by means of which joints the support rods 6 can be swivelled about their hinge joint 8 in a plane parallel to the longitudinal central plane of the convertible 1, the swing plane being located next to the lower end of the associated roof pillar 2a. The straight support rods 6 are inclined approximately at right angles to the longitudinal extension of the roof pillars 2a, as a result of which they stand up perpendicularly and are thus primarily loaded in the case of buckling (compression loaded). Because of this loading, the support rods 6 are preferably of tubular construction, as a result of which they are particularly resistant to buckling and are of a low weight.

Furthermore, the connecting rod arrangement generally comprises the rear window pane 5 as a large sized guide connection. For this purpose, it is attached above its upper edge side to the roof shell 2 by means of two hinge joints 9 and below its lower edge side to the luggage compartment part 4 by means of two hinge joints 10, all the geometric hinge axes of the hinge joints 9 and 10 running parallel to one another and to those of the hinge joints 7 and 8. The two hinge joints 10 are loaded essentially at the same level as the hinge joint 7 and, viewed in the longitudinal direction of the vehicle, are only at a small instance from the latter. As a result, favorable lever conditions are obtained for a closing process of the roof in which the frameless rear window pane 5 has to be pressed down onto its seal seat 11 on the roof shell 2 counter to the force of a seal. Due to the coupling of the lower edge of the rear window pane 5 to the luggage compartment part 4, the rear window pane 5 also has to form, along its lower edge side, the lower termination of the roof. Therefore, the seal seat 11 is only arranged along the lateral window pane edges and the upper window pane edge on the roof shell 2, while along the lower window pane edge it is formed by a vehicle body flange of the luggage compartment part 4. In addition, the swivel length, predetermined by the spacing of the hinge joints 9 and 10 of the rear window pane 5 which functions as a guide connection, coincides essentially with the swivel length of the two support rods 6.

Figure 2:
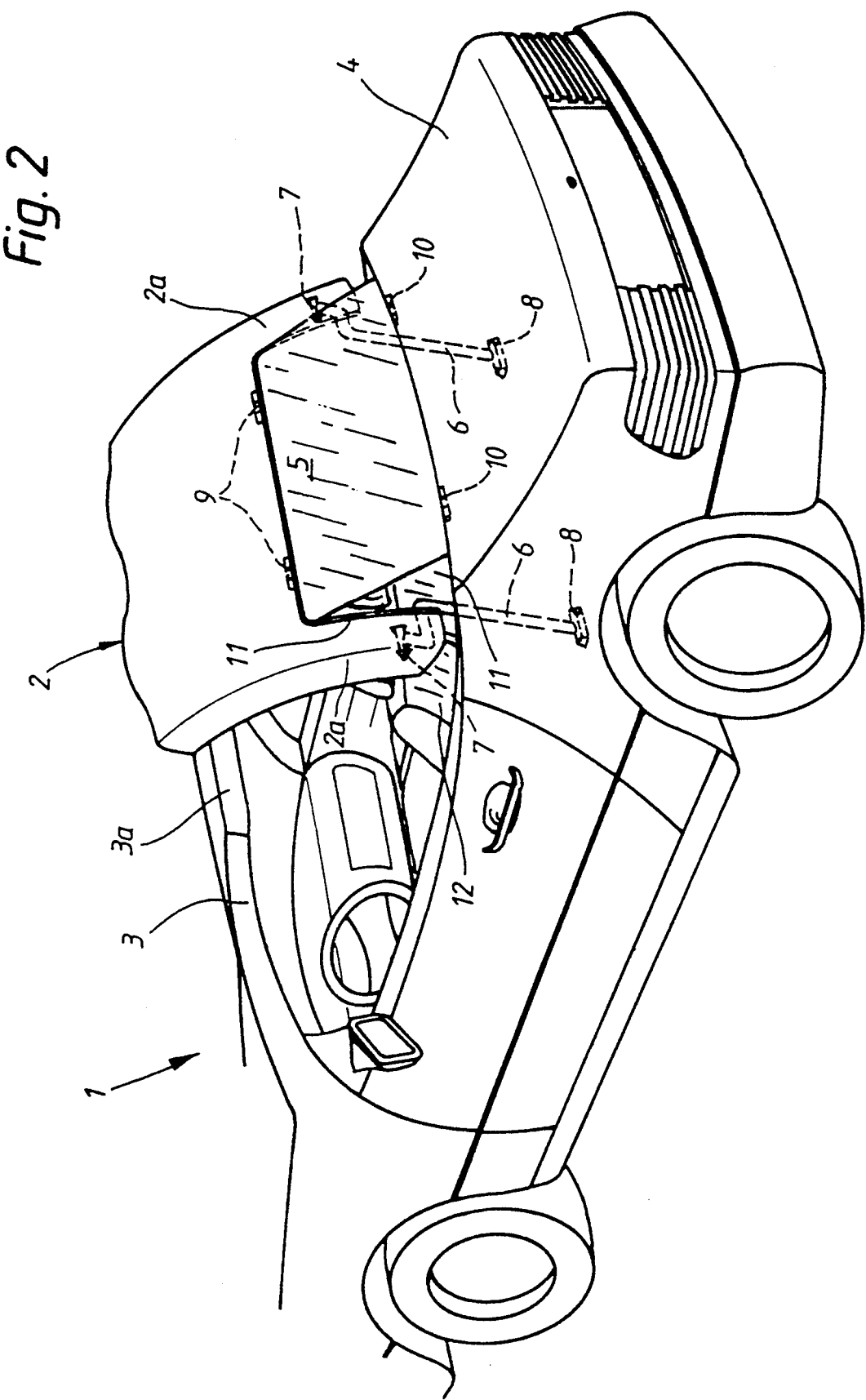
FIG. 2 shows an oblique, perspective view of the convertible from the rear after the end of the first opening movement phase of the hard top of the FIG. 1 embodiment.
Figure 3:
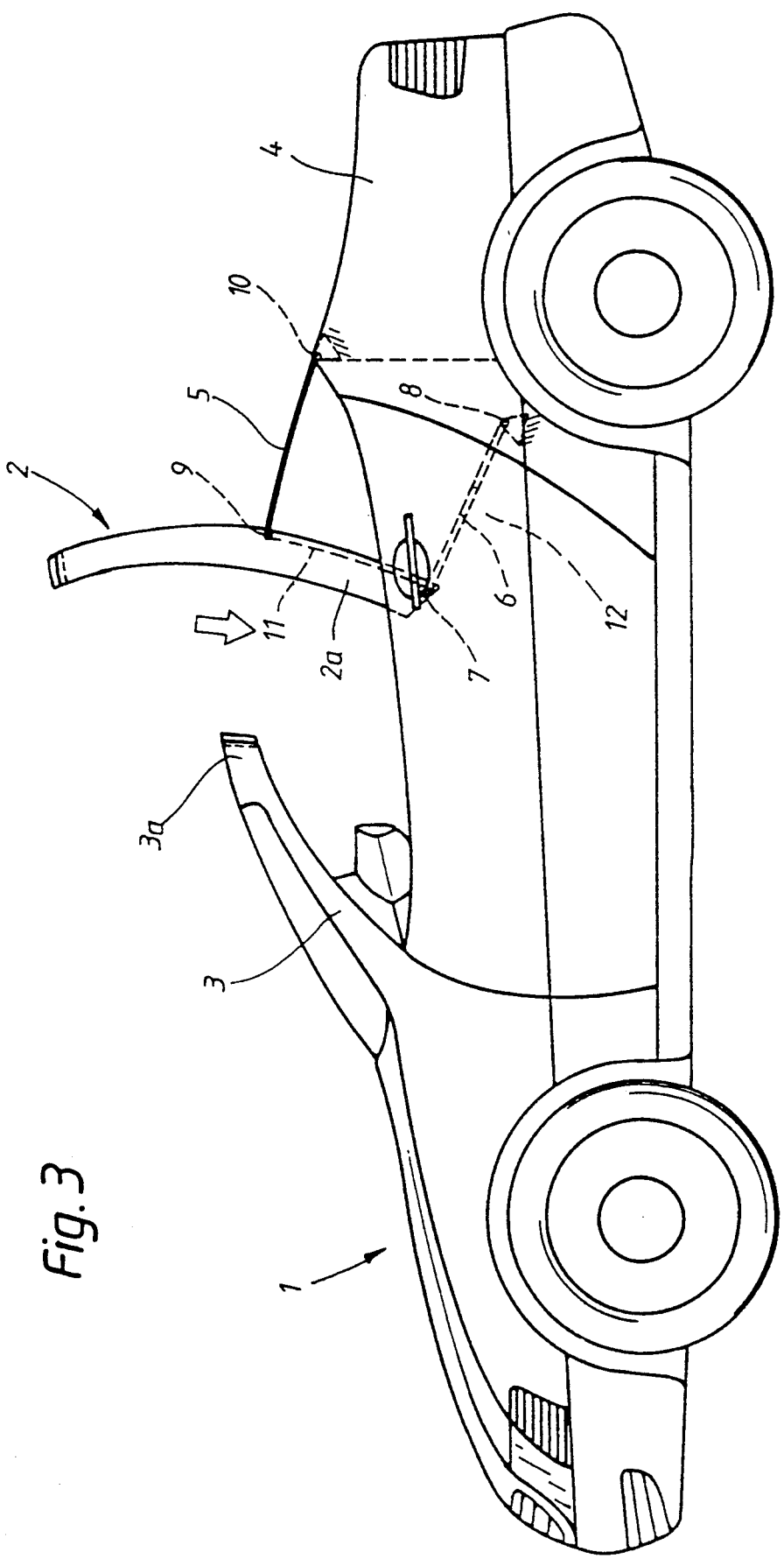
FIG. 3 shows a side view of the convertible of FIG. 1 in a second opening movement phase of the hard top.

Due to the previously described connecting rod arrangement, after the release of the connection to the frame profile 3a, the roof shell 2 can be lowered, with positive movement control, into a receiving space 12 which is limited in the passenger compartment of the convertible 1 by the backrests of the front seats and an end wall of the luggage compartment part 4. For this purpose, the roof shell 2 is raised at the front end until it has reached a completely upright intermediate position visible in FIG. 2. In this process, the support rods 6 swing forwards about the hinge joints 8 as far as the vertical position of the support rods 6, as a result of which the hinge joints 7 are moved upwards and thus the roof shell 2 attached by means of these is also correspondingly raised. At the same time, the distance of the hinge joints 7 from the hinge joints 10 is increased since the roof pillars 2a also swing forward about the hinge joints 9 into a vertical position. During this movement of the roof pillars 2a relative to the rear window pane 5, the latter is at the same time lowered from its seal seat 11. Since the hinge joints 7, 8, and 9 are located on top of one another in a vertical extended position, this intermediate position is relatively stable but can be overcome without difficulty by means of rearwardly directed pressure or pulling on the rear end of the roof shell 2 or by forwardly directed pressure or pulling on one of the roof pillars 2a, after which the roof shell 2 is moved downwards and lowered into the receiving space 12. As a result of the connecting rod geometry, the roof shell 2 is pushed, as can be seen in FIG. 3, at the beginning of the immersion process into the receiving space 12 located below the roof pillars 2a. This lowering process occurring along the length of the roof shell 2 occurs by means of a parallel displacement of said shell since the support rod 6 and the rear window pane 5 cooperate with the roof pillars 2a in a parallelogram-like manner.

Figure 4:
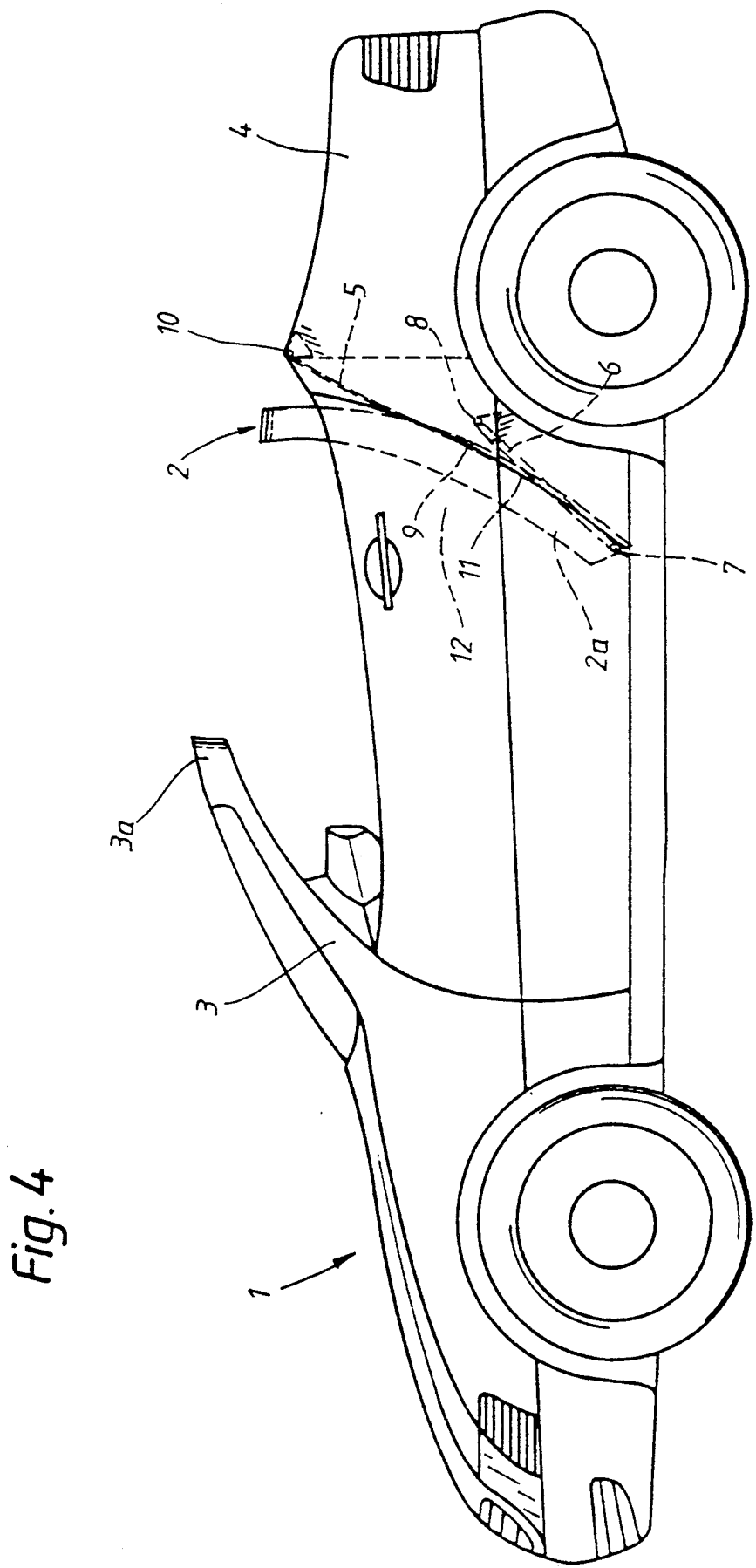
FIG. 4 shows a further side view of the convertible of FIG. 1 with a complete opened hard top.

FIG. 4 shows the roof shell 2 in its lower end position in which it is lowered, with the exception of its front end area, into the receiving space 12. Since in the last lowering movement phase it was displaced in parallel towards the rear, it is located directly in front of an oblique transverse plane of the receiving space 12 in which the rear window pane 5, which is swivelled downwards from its operating position through approximately 90° is deposited. The roof pillars 2a are located below the rear window pane 5 virtually in the same transverse plane, as a result of which the support rods 6 run virtually parallel to the roof pillars 2a. By means of the support rods 6, which thus act as tensile struts, a very stable longitudinal support of the roof shell 2 on the vehicle body is provided. The length of the roof shell 2 is dimensioned in such a way that its front end area projecting out of the receiving space 12 can act as a roll bar. For this purpose the protruding portion corresponds approximately to the protruding portion of the back rests, provided in each case with a headrest, of the driver's seat or the front seat passenger's seat 13.

In order to ensure that, even with the roof opened, a sufficient rear view is provided from the vehicle seats 13 and, nevertheless, a shielding of the seats against drafts is maintained by the upwardly protruding longitudinal area of the roof shell 2, the front end faces of the roof shell 2 and the opposite connecting face of the frame profile 3a run, viewed in the lateral direction of the roof, not straight but rather with a curved contour. This curved contour which is mirror-symmetrical with respect to the longitudinal central plane of the convertible 1, as can be seen in FIG. 5 and FIG. 6, comprises in the central third of the width of the roof a rearwardly directed indentation 14 of the roof shell 2 which starts from the end face of the roof shell 2 which is curved over the adjacent length in a circular segment shape. So that it can run in a manner which complements the latter, the connecting face of the frame profile 3a is correspondingly widened by means of a rearwardly directed bulge arranged in the central area. The front face end of the roof shell 2 is curved here in a wave shape viewed over its entire length, the bulge 14 being bordered by a wave trough and the two edges of the wave crests adjoining the wave trough on both sides. The two wave crests are each located in the center of the vehicle seat 13 assigned to them and then merge into a flatter wave trough, in the center of which the end face of the roof shell 2 ends in each case at one of the two front corners of the same. Corresponding to the smaller indentation of the roof shell 2 in the two end areas of the end face, the frame profile 3a is also widened to a lesser extent in its end areas than in its central area.

Since, when the roof is open, the roof shell 2 is completely upright, the indentation 14 permits a sufficient view to the rear despite its extension in the longitudinal direction of the roof shell being small in itself. By means of the two indentations, near to the sides, at the front end of the roof shell 2, the view to the rear corners of the convertible 1 is also improved, as a result of which the all-round view when parking the convertible 1 is also distinctly improved.

Due to the widening of the frame profile 3a, in the central area of the frame profile 3a, a larger-sized area is available which can be utilized for arranging an actuation element for locking and unlocking the roof shell 2 with respect to the frame profile 3a, whereby an easy-to-handle arrangement for manual actuation is produced. The arrangement illustrated diagrammatically in FIG. 7 comprises a finger-grip knob 15 as actuation element, which knob is let into the underside of the frame profile 3a and is rotatably mounted in a direction-reversible manner about an essentially vertical axis. With the finger-grip knob 15, a coaxial cam disc (not illustrated) is rotated, the rotational movement of which is converted into an axial advance of two drive rods 16 which are longitudinally displaceably mounted inside the frame profile 3a and are each supported by one end on the circumference of the cam disc. The drive rods 16, arranged diametrically to the cam disc, run parallel to the central longitudinal axis of the frame profile 3a and are axially spring-loaded in the direction of the cam disc by means of one restoring spring 17 in each case.

The end of the drive rods 16 facing away from the cam disc engages in an exactly fitting manner into a transverse bore of an assigned lock ring 18 when the roof is closed. The two lock rings 18 which cooperate with the drive rods 16 project forwards on both sides of the indentation 14 from the end face of the roof shell 2 and penetrate an opening in the roof profile 3a lying opposite, as a result of which their transverse bores arranged at the free end, arrive in a position which is largely co-axial to the drive rods 16 when the roof is closed. So that the pretensioning force of a seal supported between the roof shell 2 and the frame profile 3a can be overcome during the locking process, the end areas, which cooperate with the lock rings 18, of the drive rods 16 can expediently be cone-shaped or wedge-shaped.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A lowerable vehicle roof for a vehicle having a seat area, a receiving space for said roof and a front windscreen frame having a frame profile, comprising:
   a dimensionally stable roof shell, having a front end face, arranged in a front end area of said roof, said roof shell extending over the entire width of said roof and, when said roof is closed, being detachably connected to said frame profile which lies opposite said front end face and, when said roof is opened, being held in a substantially transverse plane of the vehicle located behind the seat area;
   a pivotal mount for said roof shell arranged about a horizontal vehicle transverse axis;
   wherein said roof shell protrudes out of the receiving space to form a roll bar;
   wherein the front end face is indented in the longitudinal direction of the vehicle in a center area of said roof shell when said roof is closed;
   wherein said frame profile is widened in the central area to complement said indentation of the roof shell; and
   wherein when said roof is open, said indentation of the front end face of the roof shell forms a viewing opening.

2. Vehicle roof according to claim 1, wherein the end face of the roof shell is curved in a circular segment shape in its longitudinal area which delimits the indentation.

3. Vehicle roof according to claim 2, wherein the end face is curved in a wave shape viewed over its entire length, the indentation being bordered by a wave trough and the two edges of the wave crests adjoining it, and the wave crests being arranged in each case approximately in the center of an assigned seat.

4. Vehicle roof according to claim 1, wherein the dimensionally stable roof shell includes rear roof pillars, said roof shell with rear roof pillars comprising the entire roof, the roof shell being pushed lengthwise into the receiving space of the vehicle when the roof is open.

5. Vehicle roof according to claim 4, wherein the pivotal mount attaches the roof shell to the body of the vehicle using a connecting rod arrangement, by means of which connecting rod arrangement its movement is guided during opening and closing.

6. Vehicle roof according to claim 1, wherein a locking device is provided on both sides of the indentation for the purpose of a detachable connection of the roof shell to the frame profile of the front windscreen frame, the locking device being simultaneously lockable by means of a centrally arranged actuation element.

7. Vehicle roof according to claim 6, wherein the actuation element is arranged in the center of the width of the roof on the frame profile of the front windscreen frame.

8. Vehicle roof according to claim 6, wherein the locking devices are operatively connected to the actuation element by means of a pair of drive rods.

9. Vehicle roof according to claim 8, wherein a finger-grip knob with axis of rotation running transversely to the closed roof is provided as the actuation element.

* * * * *